(12) United States Patent
Hartmann et al.

(10) Patent No.: US 10,071,606 B2
(45) Date of Patent: Sep. 11, 2018

(54) SENSOR HOUSING FOR MOUNTING IN A VEHICLE WHEEL

(71) Applicant: Bayerische Motoren Werke Aktiengesellschaft, Munich (DE)

(72) Inventors: Jochen Hartmann, Mering (DE); Hubert Schumacher, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 7 days.

(21) Appl. No.: 15/281,210

(22) Filed: Sep. 30, 2016

(65) Prior Publication Data

US 2017/0015152 A1   Jan. 19, 2017

Related U.S. Application Data

(63) Continuation of application No. PCT/EP2015/054322, filed on Mar. 2, 2015.

(30) Foreign Application Priority Data

Apr. 3, 2014   (DE) ........................ 10 2014 206 463

(51) Int. Cl.
| | |
|---|---|
| *B60C 23/04* | (2006.01) |
| *G01M 17/02* | (2006.01) |
| *B29D 30/00* | (2006.01) |

(52) U.S. Cl.
CPC ...... *B60C 23/0493* (2013.01); *B29D 30/0061* (2013.01); *G01M 17/02* (2013.01);
(Continued)

(58) Field of Classification Search
None
See application file for complete search history.

(56) References Cited

U.S. PATENT DOCUMENTS

| | | | |
|---|---|---|---|
| 9,764,607 B2 * | 9/2017 | Uh | ...................... B60C 23/0498 |
| 2006/0248947 A1 * | 11/2006 | Phalak | ................ B60C 23/0408 73/146 |

(Continued)

FOREIGN PATENT DOCUMENTS

| | | |
|---|---|---|
| CN | 103038072 A | 4/2013 |
| DE | 10 2006 038 059 A1 | 3/2007 |

(Continued)

OTHER PUBLICATIONS

International Search Report (PCT/ISA/210) issued in PCT Application No. PCT/EP2015/054322 dated Jun. 9, 2015, with English translation (four (4) pages).

(Continued)

*Primary Examiner* — Andre Allen
(74) *Attorney, Agent, or Firm* — Crowell & Moring LLP

(57) ABSTRACT

A sensor housing for mounting in a vehicle wheel, preferably a motor vehicle wheel and preferably on an inside of a tire of the wheel, is provided. The sensor housing includes a base surface for securing the sensor housing in the inner chamber of a wheel, a receiving area having a recess for receiving a sensor, and a predetermined breaking point for breaking open the receiving area and thus for releasing the sensor from the receiving area, preferably in a manner that prevents reuse of the sensor housing. A sensor arrangement including the sensor housing and a sensor received therein is also provided.

20 Claims, 4 Drawing Sheets

(52) U.S. Cl.
CPC ............ *B29D 2030/0072* (2013.01); *B29D 2030/0083* (2013.01)

(56) References Cited

U.S. PATENT DOCUMENTS

| | | |
|---|---|---|
| 2007/0040660 A1 | 2/2007 | Miller et al. |
| 2011/0240195 A1 | 10/2011 | Ellmann |
| 2012/0204635 A1* | 8/2012 | Kutzscher ........... B60C 23/0493 73/146.8 |
| 2013/0025751 A1 | 1/2013 | Dassano et al. |
| 2013/0305818 A1 | 11/2013 | Hartmann et al. |
| 2014/0261944 A1* | 9/2014 | Papakonstantopoulos ................. B60O 5/14 152/510 |
| 2015/0191055 A1 | 7/2015 | Schumacher et al. |
| 2016/0163134 A1* | 6/2016 | Cimponeriu ........ B60C 23/0488 701/29.7 |

FOREIGN PATENT DOCUMENTS

| | | | |
|---|---|---|---|
| DE | 10 2009 006 707 A1 | 8/2010 | |
| DE | 10 2011 003 134 A1 | 7/2012 | |
| DE | 10 2011 003 707 A1 | 8/2012 | |
| EP | 0 694 861 A2 | 1/1996 | |
| FR | 2839016 A1 * | 10/2003 | ......... B60C 23/0408 |
| JP | 2007-99052 A | 4/2007 | |
| WO | WO 2006/126215 A1 | 11/2006 | |
| WO | WO 2008/133314 A1 | 6/2008 | |
| WO | WO 2013/098711 A1 | 7/2013 | |
| WO | WO 2014/041060 A1 | 3/2014 | |

OTHER PUBLICATIONS

German Search Report issued in counterpart German Application No. 10 2014 206 463.5 dated Jun. 18, 2014, with partial English translation (eleven (11) pages).

Chinese-language Office Action issued in counterpart Chinese Application No. 201580010102.4 dated Apr. 1, 2017 with English translation (thirteen (13) pages).

* cited by examiner

SENSOR HOUSING FOR MOUNTING IN A VEHICLE WHEEL

CROSS REFERENCE TO RELATED APPLICATIONS

This application is a continuation of PCT International Application No. PCT/EP2015/054322, filed Mar. 2, 2015, which claims priority under 35 U.S.C. § 119 from German Patent Application No. 10 2014 206 463.5, filed Apr. 3, 2014, the entire disclosures of which are herein expressly incorporated by reference.

BACKGROUND AND SUMMARY OF THE INVENTION

The invention concerns a sensor housing for mounting in a vehicle wheel, preferably in a motor vehicle wheel. The sensor housing in particular is mounted in the tire of the wheel. The sensor housing serves to receive a sensor. Furthermore, the invention pertains to the sensor and an arrangement comprising the sensor housing and the sensor.

In modern motor vehicles, tire pressure checking systems are installed in order to alert the driver as to a pressure drop, for example. A sensor is placed in each tire, being able to measure the pressure and optionally the temperature and relay this information along with a distinct sensor ID to the vehicle, where this information can be further processed. By matching up the sensor ID with a wheel position, the relayed information can be evaluated specifically to the wheel. Methods for recognition of sensors and matching them up with wheel position are known and available. The relaying of information from the wheel to the vehicle is done by means of standardized radiotelegrams. The reception is done with an antenna and the processing of the information takes place in a control unit.

For the sensors, one distinguishes between rim mounted and tire mounted sensors. Rim mounted sensors are not connected to the tire and thus the tire can be changed without having to also change the sensor. The tire information stored in the sensor is thus not distinctive. Tire mounted sensors are secured in the tire contact area and are thus distinctively connected to the tire. In this way, tire information can be relayed to the vehicle. The sensors are held in the tire by means of a rubber support. For the rubber supports, one distinguishes between systems in which the support and the sensor can be arranged separately from each other: the support can be secured in the tire contact area in one work step and the sensor is placed with a special tool in the support in a second work step. The second work step can occur immediately after putting the support in place or it can be totally independent in space and time, but in any case before the tire is mounted on the rim. The second system requires the sensor and the support to be designed so that the sensor is already in place when the support is fastened in the tire contact area. Thus, a separation in time and space of the support and the sensor mounting is not possible. In both cases, when disposing of the tire, the sensor must be separated from the tire for environmental protection reasons. At present, the sensors are cut out with knives or in the case of the two-step mounting concepts they are removed with the aid of screwdrivers or other unsuitable tools.

The problem to be solved by the present invention is to indicate a sensor housing for mounting in a vehicle wheel, which can be easily mounted for the receiving of a sensor, wherein the dismounting of the sensor should be as easy as possible and can be done in a reproducible work step. Furthermore, the problem of the present invention is to indicate a suitable sensor and an arrangement with the sensor and the housing.

Thus, the problem is solved by a sensor housing. This sensor housing is designed for mounting in a vehicle wheel, preferably on a tire. In particular, it is a motor vehicle wheel. The sensor housing has a base surface for the fastening of the sensor housing in the interior of the wheel. Moreover, the sensor housing comprises a receiving area with a recess. The sensor can be installed in this recess. The receiving area has at least one predetermined breaking point. This predetermined breaking point serves to break open the receiving area and thus release the sensor from the receiving area. The sensor serves preferably to measure pressure and/or temperature and/or wear and tear. The sensor, in particular, is a directly measuring sensor. Thus, the sensor directly measures the air pressure, for example, and transmits this data by radio to the vehicle. Thanks to the use of the predetermined breaking point, the sensor can be released once more from the sensor housing, especially without the use of a tool. At the same time, there is the advantage that, by being broken open at the predetermined breaking point, the sensor housing is destroyed and thus can no longer be reused improperly. With previously known systems, it was always the problem that, due to lack of standardization, the result of dismounting of the sensor could not be assured or reproduced. This is because the sensor in these systems is removed with nondefined tools. The sensor housing according to the invention now makes it possible, depending on the application, to loosen the sensor without destruction and to reuse it (for example, for a tire replacement), or to remove the sensor in a defined manner and send it on to a secure destruction process. Furthermore, the sensor housing is totally destroyed by the predetermined breaking point and it cannot be reused again. In the previously known systems, it was namely the problem that when the sensors were removed with undefined tools the housing or the supports would be partly destroyed and reused. This sometimes resulted in faulty mounted sensors.

In a preferred embodiment, the predetermined breaking point is formed by a material narrowing in the receiving area. This enables the receiving area to be easily broken open.

Moreover, it is preferably provided that the receiving area is designed to receive the sensor such that the sensor can only be removed by destruction, preferably by breaking open the sensor housing. For this, the sensor can be entirely enclosed by the sensor housing, or else the predetermined breaking point must be labile enough so that any attempt at improper removal of the sensor results in breaking of the receiving area.

In particular, it is provided that a strap is formed on the receiving area at the predetermined breaking point. The strap is configured so that the receiving area at the predetermined breaking point breaks open by pulling on the strap. Thus, an easy, tool-less releasing of the sensor is possible.

In a first variant, this strap is an integral part of the receiving area. In particular, when the sensor housing or the receiving area is made of plastic, such a strap standing off from the receiving area can be formed.

In the second variant, it is provided that a thread or a belt is placed in the receiving area along the predetermined breaking point, wherein then one end of the thread or the belt forms this strap.

The sensor housing is preferably made of plastic; it is especially provided that the receiving area and the base surface together form a single-piece component. This enables a simple and economical manufacturing.

In particular, an adhesive is provided on the base surface for gluing the sensor housing in the vehicle wheel, preferably in the tires. Alternatively to gluing, the sensor housing can also be vulcanized in the tires.

Two possibilities are preferably provided for the formation of the recess for inserting the sensor: in the first possibility, the recess breaks through the base surface. Thus, the sensor is shoved into the sensor housing from underneath. After this, the sensor housing is fastened by its base surface in the wheel. Therefore, the wheel, especially the tire contact surface, closes the recess and the sensor can no longer be taken out without destroying the sensor housing. According to the second possibility, the recess is open at the top and closed at the bottom by the base surface. In this case, it must be ensured that the sensor, although able to be shoved through the recess open on the top, is nevertheless secured in the recess by force fitting, form fitting, or material fitting, so that in this case as well a removal of the sensor is only possible by destroying the sensor housing. For this, in particular, at least one detent element is formed at the receiving area for the form fitting holding of the sensor in the recess. In addition or as an alternative, it is possible to make the receiving area elastic in at least certain places and the recess correspondingly narrow, in order to hold the sensor in the recess by force fitting.

The invention furthermore comprises a sensor for use with a sensor housing. The sensor serves preferably to measure the pressure and/or temperature and/or wear and tear. The sensor is preferably characterized by an integrated detection unit. This detection unit is part of the sensor and is designed to detect a breaking open of the receiving area when the sensor has been inserted into the housing. The data stored in the sensor are usually specific to the tire. Thus, it should be ensured that the data are deleted after separating the sensor from the tire. The recognizing of the breaking open of the receiving area is used for this. There are various change processes which can be detected by the detection unit for this.

Preferably, it is provided that the detection unit is designed to detect an opening of an electrical contact, especially a circuit, when the receiving area is broken open, or to detect a resistive change in a resistor, or to detect a capacitive change in a capacitor, or to detect a pneumatic change, or to detect an optical change. In the case of the optical change, for example, light impinges on a photocell of the detection unit due to breaking open the sensor housing.

The invention moreover comprises an arrangement with the sensor housing, as has just been described, and a sensor inserted into the receiving area. The sensor housing is fastened by its base surface on an inside of a tire of a wheel. In particular, the base surface is glued or vulcanized to the inner surface of the tire.

The receiving area extends away from a side facing away from the base surface. In the mounted state, the receiving area can extend from the wheel inner side into the wheel interior. The receiving area is preferably ring shaped or polygonal in cross section, especially so that the receiving area can receive the sensor in its recess. At least one predetermined breaking point is formed circumferentially around the receiving area. The at least one predetermined breaking point extends along the circumference or along the outer surface of the receiving area, especially such that an upper part of the receiving area is at least partly, preferably completely, separated from a lower part of the receiving area when broken open. The upper part of the receiving area is arranged next to a top side of the sensor, while the lower part of the receiving area is formed next to the base surface. Preferably, the upper part of the receiving area is not welded or glued to the sensor, but instead joined by force fitting and/or form fitting. Thus, the further nondestructive dismounting of the sensor is easier. Preferably, the predetermined breaking point extends about the entire circumference. Also preferably, the sensor housing is fashioned so that, after breaking open the predetermined breaking point, the sensor can be completely removed and not be secured again in the destroyed housing. This prevents an improper reuse. Preferably, a strap is arranged in the circumferential region of the receiving area, which can stand off from the circumferential region, especially so that an installer can grab it to remove the sensor. The strap can be an integral part of the receiving area. In particular, such a strap standing off from the receiving area can be formed when the sensor housing or the receiving area is made of plastic. In particular, a thread or a belt can be laid along the predetermined breaking point in the receiving area, wherein one end of the thread or the belt can form this strap. The thread or belt can be a separate component. Alternatively, the belt can also be formed integrally in the receiving area by corresponding embossing in the region of the predetermined breaking point.

Other objects, advantages and novel features of the present invention will become apparent from the following detailed description of one or more preferred embodiments when considered in conjunction with the accompanying drawings.

DETAILED DESCRIPTION OF THE DRAWINGS

In what follows, two embodiments of the invention shall be explained more closely. The same or functionally identical components are given the same reference numbers in both sample embodiments. The figures show the respective arrangements in schematically simplified manner.

Figure 1:
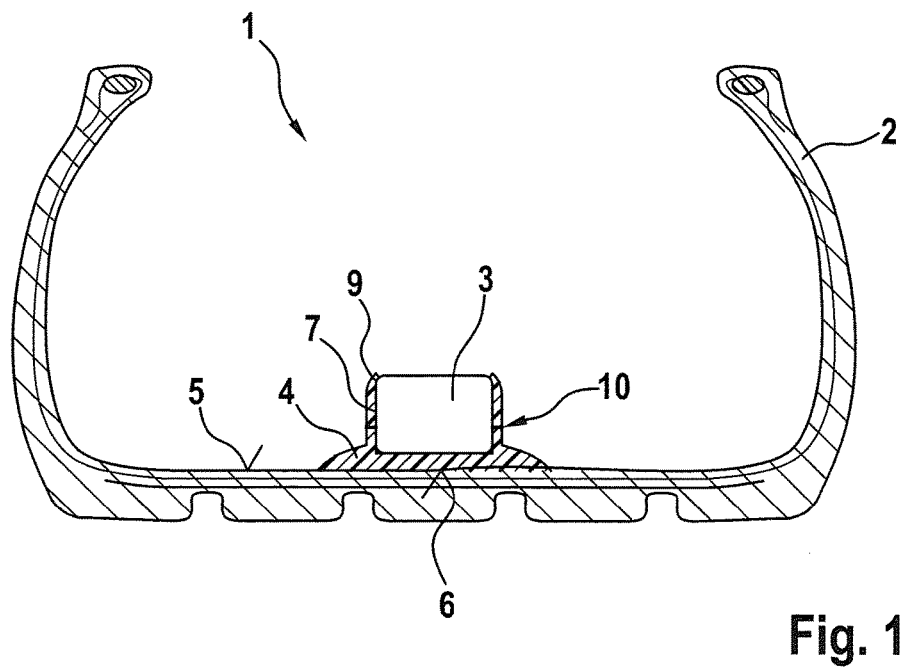
FIG. 1 shows a sensor housing and a sensor according to a first embodiment of the present invention.
Figure 2:
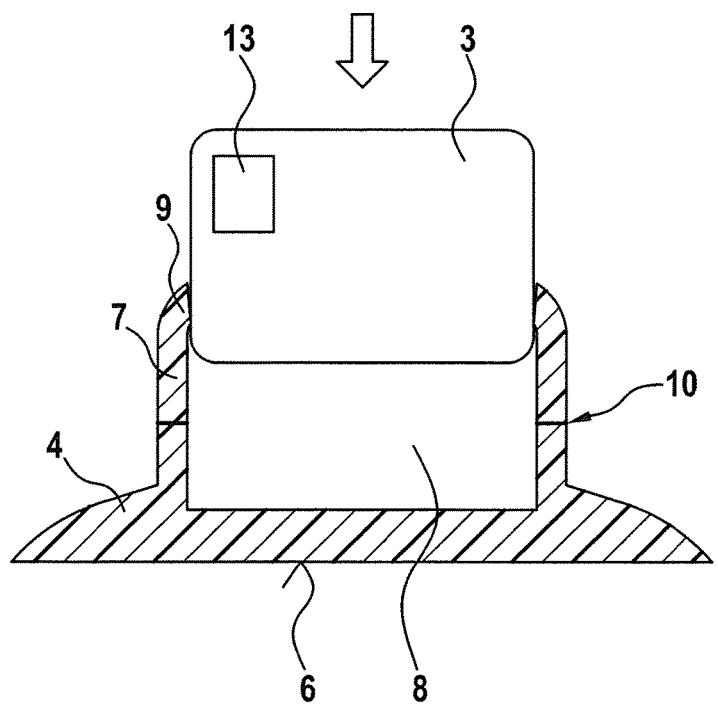
FIG. 2 shows the sensor housing with the sensor of the first embodiment.
Figure 3:
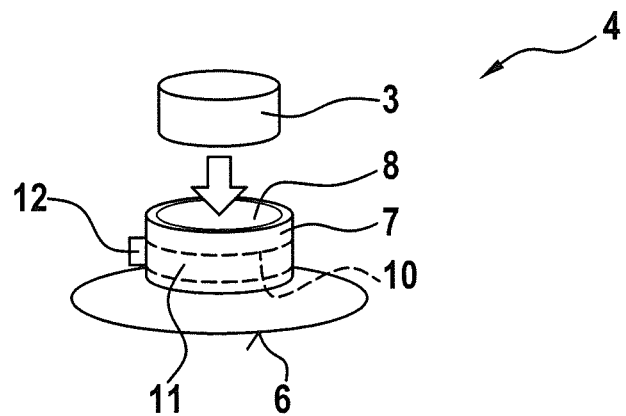
FIG. 3 shows a flow of mounting acts for FIG. 1 components.
Figure 3:
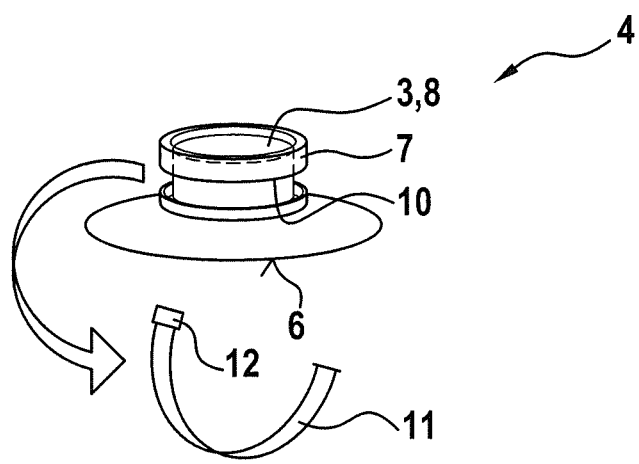
Figure 3:
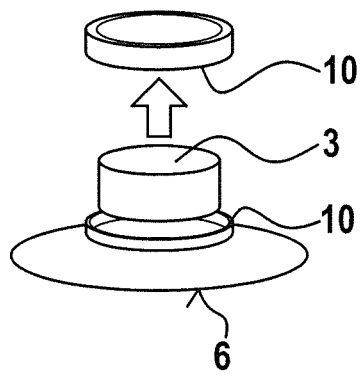

FIGS. 1 to 3 show the first embodiment. FIG. 1 shows an arrangement 1 with a section through a tire 2 of a motor vehicle. The arrangement 1 has a sensor 3 in a sensor housing 4. FIG. 2 shows the sensor 3 with the sensor housing 4 without tire 2. The arrow in FIG. 2 indicates how the sensor 3 can be inserted into the sensor housing 4.

The sensor housing 4 is a single component of plastic. The sensor housing 4 has a base surface 6. By this base surface 6, the sensor housing 4 is glued or vulcanized to an inner surface 5 of the tire 2. From the base surface 6 there extends a receiving area 7. This receiving area 7 defines a recess 8. The sensor 3 is placed in the recess 8. The recess 8 is closed at its bottom side by the base surface 6 and is open at the top. At the upper open margin the receiving area 7 has at least one detent element 9. This detent element 9 is designed to hold the sensor 3 firmly in the recess 8.

At least one predetermined breaking point 10 is fashioned circumferentially about the receiving area 7.

FIG. 3 shows the mounting and dismounting of the sensor 3 and the sensor housing 4 in three views.

As FIG. 3 shows, a belt 11 terminating in a strap 12 is situated along the predetermined breaking point 10 at the receiving area 7. This strap 12 stands off from the receiving area 7 and can be pulled by an installer. The belt 11 can be a separate component which is inserted into the receiving area 7. Alternatively, the belt 11 can also be formed integrally in the receiving area 7 by corresponding embossings in the area of the predetermined breaking point 10.

It is critical that, according to the representation in FIG. 3, the receiving area 7 breaks open at the predetermined breaking point 10 by pulling on the strap 12. In this way, the sensor housing 4 is totally destroyed and the sensor 3 can be removed undamaged.

Figure 4:
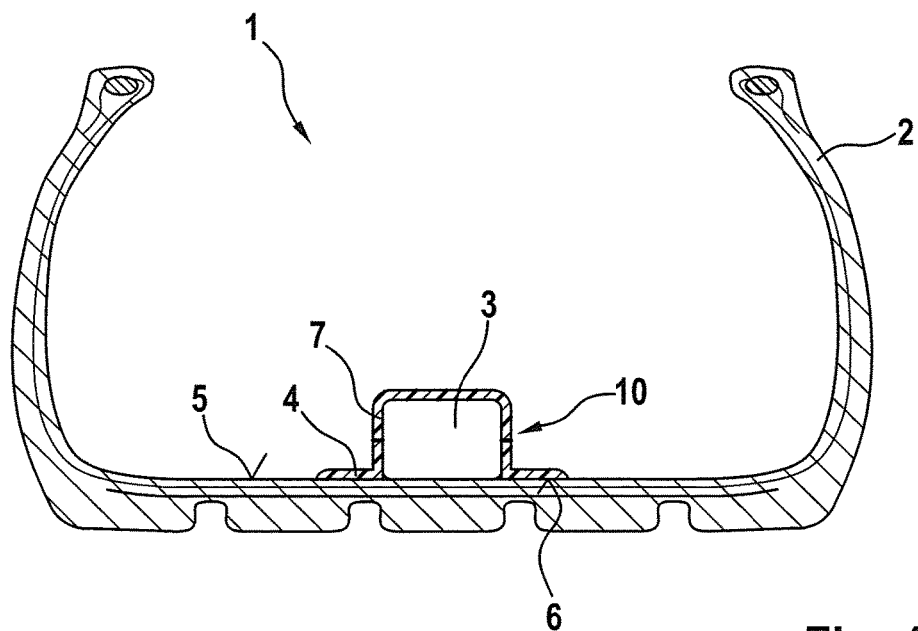
FIG. 4 shows sensor housing and a sensor according to a second embodiment of the present invention.
Figure 5:
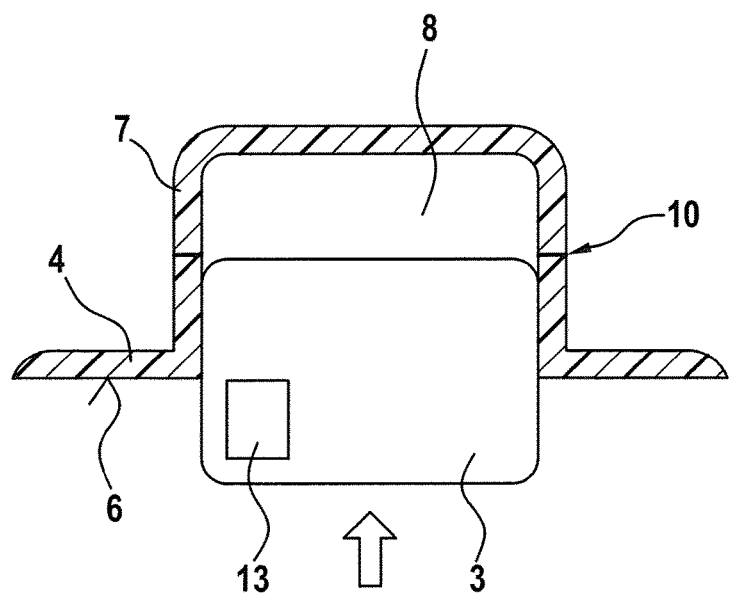
FIG. 5 shows the sensor housing with the sensor of the second embodiment.
Figure 6:
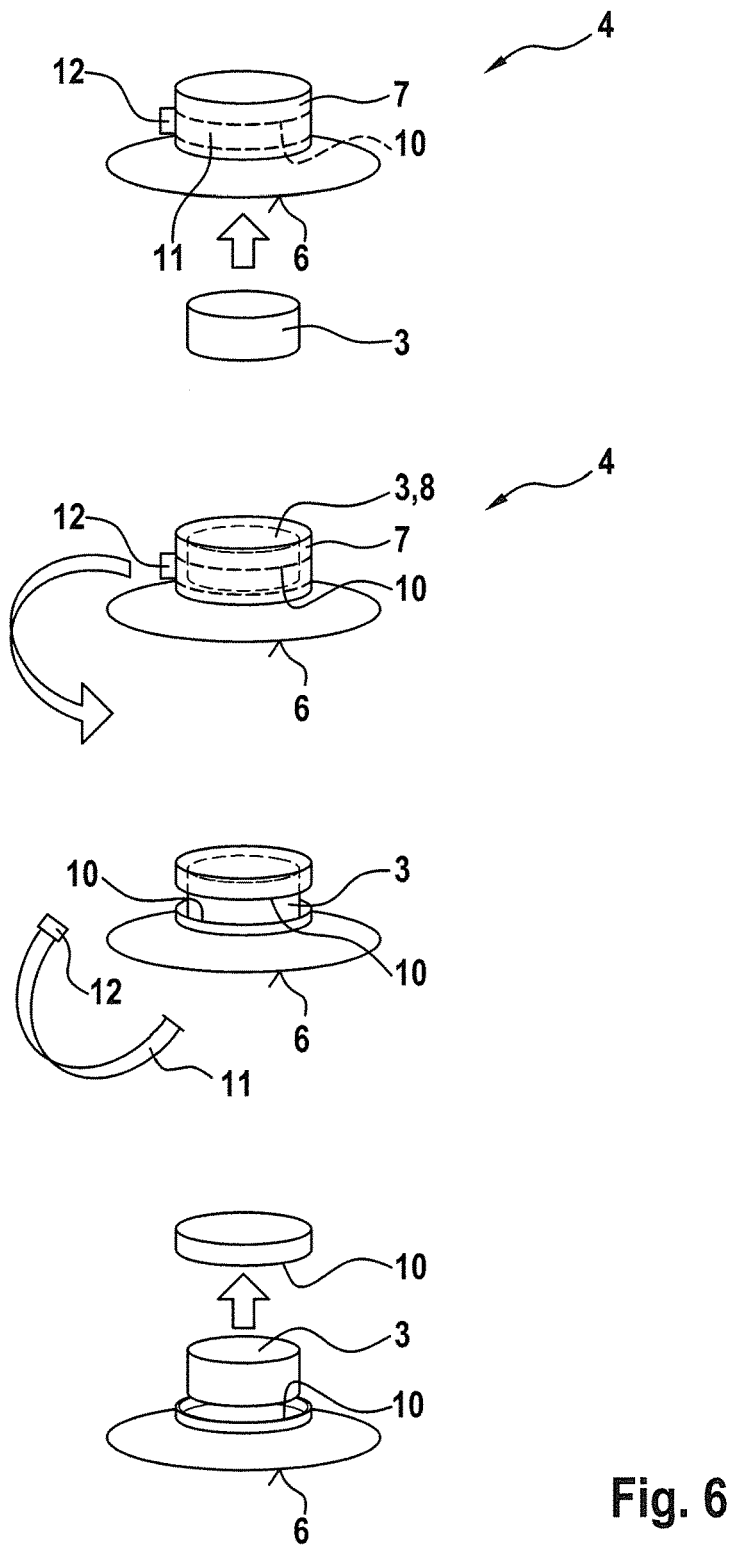
FIG. 6 shows a flow of mounting acts for the second embodiment.

FIGS. 4 to 6 show the second embodiment. In the second embodiment, the recess 8 is closed at the top and breaks through the base surface 6. The sensor 3 here is thus shoved into the recess 8 before the sensor housing 4 is fastened in the tire 2. Once the sensor housing 4 has been glued or vulcanized by its base surface 6 onto the tire 2, the sensor 3 is securely received in the recess 8.

In the second embodiment as well, per FIG. 6, a belt 11 with a strap 12 is provided. Once again, by pulling on the strap 12, the sensor housing 4 is broken open, and thus the sensor housing 4 is destroyed and the sensor 3 is removed without destruction.

As is indicated purely schematically in FIGS. 2 and 5, the sensors 3 according to the invention can have a detection unit 13. These detection units 13 are designed to detect a breaking open of the receiving area 7. This occurs, for example, by an opening of an electric contact, by a resistive change, by a capacitive change, by a pneumatic change or an optical change upon breaking open the receiving area 7.

LIST OF REFERENCE SYMBOLS 1 arrangement
2 tire
3 sensor
4 sensor housing
5 inner surface
6 base surface
7 receiving area
8 recess
9 detent element
10 predetermined breaking point
11 belt
12 strap
13 detection unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor housing for mounting in a vehicle wheel, comprising:
   a sensor housing base surface configured for securing the sensor housing in an interior of a wheel,
   a sensor housing receiving area with a recess configured to receive a sensor, and
   a predetermined breaking point of the sensor housing configured to permit breaking open of the receiving area such that the sensor is releasable from the receiving area and the sensor housing is not reusable.

2. The sensor housing as claimed in claim 1, wherein the predetermined breaking point is formed by a material narrowing in the receiving area.

3. The sensor housing as claimed in claim 2, wherein the predetermined breaking point is formed at a circumference of the receiving area.

4. The sensor housing as claimed in claim 3, wherein the receiving area is configured such that the sensor is removable from the sensor housing only by breaking open the sensor housing.

5. The sensor housing as claimed in claim 4, wherein at least one of the predetermined breaking point and the receiving area are configured such after the sensor housing is broken open the sensor housing is not reusable.

6. The sensor housing as claimed in claim 5, wherein the predetermined breaking point is configured such when the sensor housing is broken open an upper part of the receiving area is at least partly separated from a lower part of the receiving area.

7. The sensor housing as claimed in claim 6, wherein the upper part of the receiving area is not welded or glued to the sensor.

8. The sensor housing as claimed in claim 6, wherein the predetermined breaking point extends around all of the circumference of the receiving area.

9. The sensor housing as claimed in claim 6, wherein a strap is located at the receiving area at the predetermined breaking point, and
the strap is configured such that pulling on the strap results in breaking open the sensor housing at the predetermined breaking point.

10. The sensor housing as claimed in claim 9, wherein the strap is an integral part of the receiving area.

11. The sensor housing as claimed in claim 9, wherein the strap is an end of a thread or a belt located along the predetermined breaking point.

12. The sensor housing as claimed in claim 9, wherein the strap stands off from the circumference of the receiving area.

13. The sensor housing as claimed in claim 6, wherein the sensor housing is made of plastic, and
the receiving area and the base surface are formed as a single-piece component.

14. The sensor housing as claimed in claim 1, wherein an adhesive is provided on the base surface, the adhesive being arranged to permit gluing of the sensor housing in the vehicle wheel.

15. The sensor housing as claimed in claim 1, wherein the recess is configured such that the sensor is received into the sensor housing through the base surface.

16. The sensor housing as claimed in claim 1, wherein the recess is closed at a base surface side and open at another side to receive the sensor.

17. The sensor housing as claimed in claim 16, wherein the receiving area includes at least one detent element configured to retain the sensor in the recess.

18. The sensor housing as claimed in claim 1, wherein the receiving area is at least in parts elastic, and
the recess is sized such that the sensor is retaining in the recess by force fit.

19. A sensor configured for use with the sensor housing as claimed in claim 1, the sensor comprising:
   a receiving area breaking open detection unit integrated in the sensor, the receiving area breaking open detection unit being configured to detect a breaking open of the receiving area after the sensor has been inserted into the sensor housing.

20. A sensor arrangement, comprising:
   a sensor housing; and
   a sensor received in the sensor housing,
   wherein
      the sensor housing includes
         a sensor housing base surface configured for securing the sensor housing in an interior of a wheel,
         a sensor housing receiving area with a recess configured to receive the sensor, and
   a predetermined breaking point of the sensor housing configured to permit breaking open of the receiving area such that the sensor is releasable from the receiving area and the sensor housing is not reusable, and
      the sensor housing is configured to be secured at the base surface on an inside of a tire of the wheel.

\* \* \* \* \*